(12) United States Patent
Takase

(10) Patent No.: US 10,767,135 B1
(45) Date of Patent: Sep. 8, 2020

(54) METHOD OF PRODUCING OILS AND FATS AND OIL- AND FAT- PRODUCING APPARATUS

(71) Applicants: Joji Takase, Yokohama-shi, Kanagawa (JP); Hiroyuki Sudo, Annaka-shi, Gunma (JP)

(72) Inventor: Joji Takase, Yokohama (JP)

(73) Assignees: Joji Takase, Yokohama-Shi, Kanagawa (JP); Hiroyuki Sudo, Annaka-Shi, Gunma (JP)

( * ) Notice: Subject to any disclaimer, the term of this patent is extended or adjusted under 35 U.S.C. 154(b) by 0 days.

(21) Appl. No.: 16/589,763

(22) Filed: Oct. 1, 2019

(30) Foreign Application Priority Data

Feb. 14, 2019 (JP) .................................. 2019-024536

(51) Int. Cl.
*C11B 1/10* (2006.01)
*B01D 11/02* (2006.01)

(52) U.S. Cl.
CPC .......... *C11B 1/104* (2013.01); *B01D 11/0207* (2013.01); *B01D 11/028* (2013.01); *B01D 11/0223* (2013.01)

(58) Field of Classification Search
CPC . C11B 1/104; B01D 11/0207; B01D 11/0223; B01D 11/028
USPC .......................................................... 554/17
See application file for complete search history.

(56) References Cited

FOREIGN PATENT DOCUMENTS

JP 2009-291665 A 12/2009

*Primary Examiner* — Deborah D Carr
(74) *Attorney, Agent, or Firm* — Manabu Kanesaka

(57) ABSTRACT

An oil production apparatus includes a reaction vessel where raw material composed of an agricultural residue or a fishery residue is fed, a water vapor injecting unit for injecting saturated water vapor into the reaction vessel, a kneading unit for kneading a content in the reaction vessel, a temperature sensor disposed at a lower part of the reaction vessel, a pressure regulating unit regulating the pressure, a control unit for controlling driving of the water vapor injection unit, the kneading unit, the pressure regulating unit, a housing for making a working area for extraction of oil oxygen-free, a solid-liquid separation unit for separating solid from a product and water removal unit both disposed in the housing, and a nitrogen injection unit for injecting nitrogen into the housing. A method for obtaining the oil is also presented.

5 Claims, 3 Drawing Sheets

METHOD OF PRODUCING OILS AND FATS AND OIL- AND FAT- PRODUCING APPARATUS

RELATED APPLICATIONS

The present application is based on, and claims priority from, Japanese Application No. JP2019-024536 filed Feb. 14, 2019, the disclosure of which is hereby incorporated by reference herein in its entirety.

BACKGROUND OF THE INVENTION

Field of the Invention

The present invention relates to a method of producing fats and oils and a fat- and oil-producing apparatus, and more specifically, a method for producing fats and oils and an fat- and oil-producing apparatus capable of producing fats and oils from residues of agricultural products, agricultural residues, and fish residues, fishery residues, which are conventionally disposed after processing.

Description of the Related Art

A method of separating oil from food is disclosed, for example, in JP 2009-291665 A. According to the fats and oils (Hereinafter referred to as oils) separation method disclosed in JP 2009-291665 A, a solution to be processed is prepared by adding water to the raw material composed of a food residue; the water is held in a high temperature and high pressure vessel to be in a subcritical water state. In addition, because of a low dielectric constant of the subcritical water, oils contained in the raw material is mixed with the water and can be extracted.

Specifically, as shown in FIG. 3, the raw material composed of the food residue is first fed into a crushing tank 51, and is then crushed by a crusher 52, and water is added so that the solid content becomes 10 to 40%.

A residue solution thus prepared is fed to a raw material tank 53 by a liquid feed pump 61, then is further kneaded by a kneader 54, and is delivered to a preheating section 56 of a hydrothermal reactor 55 by a pushing pump 62 in a state of being pressurized at 3 MPa.

In the hydrothermal reactor 55, the residue solution is preheated to about 150° C. in a preheating section 56 and then supplied to a vertical reactor 57. In the vertical reactor 57, the residue solution is heated to about 200° C. by a heater (not shown) and kept at the temperature with a pressure of 3 MPa, and retained for about 10 minutes.

As a result, the water in the residue solution is brought into a subcritical state, and thus has a lower dielectric constant, and is brought into a state close to an organic solvent, where water and oil are easily mixed, and comes to mix with oil in the food residue.

In addition, the residue solution thus processed in the hydrothermal reactor 55 is cooled to about 90 to 100° C. by passing through a liquid transporting duct in a cooling water tank 58 from the vertical reactor 57, and the pressure of the residue solution is depressurized to an atmospheric pressure, a normal pressure, by passing a back pressure valve 59. When the water returns from the subcritical state to the normal state under the atmospheric pressure, the oil and water being mixed in the vertical reactor 57 come to a separated state, and the residue solution is supplied to a processed-water tank 60.

Here, the residue solution is kept at 90° C. and separates into oil and water layers. That is, the oil extracted from the residue solution floats on the top thereof in the processed-water tank 60 and is separated via an oil separation pipe; the oil is used, for example, for industrial use.

Incidentally, the main purpose of the oil separation method disclosed in JP 2009-291665 A is to separate oil from a food residue and to produce feed and the like. Therefore, the food residue solution needs to be heated to a high temperature, 200° C., and placed under a high pressure, 3 MPa, so as to decompose proteins in the food residue into small molecules by hydrolysis reaction, and then to be bacteriologically sterilized, and further to detoxify bacterial toxins and the like.

In order to cause a hydrolysis reaction, the food residue is heated to a high temperature, for example, 200° C., using a preheater or a heater in a vertical reactor and held, and is pressurized by a pressure pump in the hydrothermal reactor.

However, the oil separation method as described above has a problem in that cost of equipment increases because a pulverization tank, a raw material tank, a mixer, and the like, and further a hydrothermal reactor 55 having a high-pressure durable vertical reactor are required.

In particular, a vertical reactor having high pressure durability against a high pressure of 3 MPa or more, should be used and this causes a problem of increase in cost of equipment.

Moreover, needs of heating at a high temperature for a predetermined time using a heater in the hydrothermal reactor causes to raise a problem of large power consumption and high operation cost.

Further, in the oil separation method disclosed in JP 2009-291665 A as described above, the oil separated from the residue is oxidized when exposed to the atmosphere, and thus is not suitable for use for edible oil, cosmetics and medicines.

In addition, oils of plants such as crops are constituents of cell membranes, but particularly good and rare oils are contained in seed coats.

For example, in the case of separating and extracting oil contained in plant seed coats and the like according to the oil separation method disclosed in JP 2009-291665 A, seeds of plants as raw materials are finely crushed with the mixer of the crushing tank as a pretreatment step.

However, the seeds of plants are hard and difficult to crush, and especially when the size of the seeds is small, there are some cases even the crusher 52 of the crushing tank 51 cannot crush them at all.

Therefore, grinding the seeds of plants has a problem in that the use of a chemical that may have safety issues is needed, or more complicated steps are required and it causes to increase operation cost. Therefore, especially in the case of agricultural residues, the plant seeds were often disposed as wastes.

In addition, there is also a problem in that when oil extracted from plants or fish is exposed to the outside air, as mentioned above, stable product quality cannot be expected due to oxidation, and safe product quality cannot be provided due to the influence of bacteria, various fungi, living therearound.

SUMMARY OF THE INVENTION

The present invention has been made to solve the above-described technical problems, and it is an object of the present invention to provide a method of producing oils and an oil producing apparatus that can be used for extracting highly safe oil at low cost and easily from residues of agricultural products and fish that have conventionally been regarded as wastes after processing.

A method of producing oil according to the present invention for achieving the above-described object includes: a step of feeding a raw material composed of an agricultural residue or a fishery residue into a reaction vessel; a step of injecting saturated water vapor in the reaction vessel after the feeding of the raw material; a step of starting kneading in the reaction vessel with keeping injecting water vapor; a step of terminating the injection of the water vapor at a timing when a pressure in the reaction vessel and a temperature of a lower part of the reaction vessel are raised to a predetermined pressure and a predetermined temperature set based on a type of the raw material; a step of depressurizing an inside of the reaction vessel, and taking out a product from the interior of the reaction vessel; and a step of extracting oil from the product in an oxygen-free condition, and in the oil producing method, the step of extracting oil from the product in the oxygen-free condition includes a step of solid-liquid separation for removing the solid from the product, and a step of removing water from the liquid obtained in the step of the solid-liquid separation and obtaining oil, and the step of extracting oil from the product in an oxygen-free atmosphere is performed in a housing in which nitrogen gas is introduced.

The method further includes a step of continuing kneading for a predetermined time after completion of the injection of water vapor until the temperature of the lower part in the reaction vessel reaches a predetermined temperature, and thereafter the pressure in the reaction vessel may be reduced.

Here, in the step of terminating the injection of the water vapor at a timing when the pressure in the reaction vessel and the temperature of the lower part of the reaction vessel are raised to a predetermined pressure and a predetermined temperature set based on a type of the raw material, it is preferable that the predetermined pressure is in a range from 1.1 MPa to 1.75 MPa, and that the predetermined temperature is in a range from 110° C. to 181° C.

Note that it is preferable that the predetermined pressure is less than 3 MPa, and further, be 1.75 MPa or less, because a configuration that does not require a high pressure durable reaction vessel is preferable. Further, the predetermined temperature is preferably less than 200° C. and more preferably 181° C. or less, because a configuration that does not require a heater is preferable.

Further, in the case of avocado as the raw material, in the step of terminating the injection of the water vapor at a timing where the pressure in the reaction vessel and the temperature of the lower part of the reaction vessel are respectively raised to a predetermined pressure and a predetermined temperature set based on a type of the raw material, it is preferable that the predetermined pressure is at least 1.20 MPa and the predetermined temperature is at least 120.7° C.

According to the method described above, the inside of the sealed vessel can be brought into a high pressure and high temperature state by injecting water vapor into the reaction vessel that contains the raw material composed of an agricultural residue or a fishery residue. As a result, it is possible to effectively crush cell membranes of the raw material and to break the outer shell of the seed and the like due to a pressure difference and high heat, and to easily obtain oil in the seeds and oil in the coats.

In addition, since the process is performed in oxygen-free condition from the taking out of the product in the reaction vessel to the extraction of the oil, oxidation of oil can be prevented, and a product with stable quality and high safety can be obtained.

In addition, since the pressure in the reaction vessel is much lower than that of a reaction vessel used in the conventional oil separation method, such a high pressure durable reaction vessel conventionally employed is not necessary.

Moreover, since pressurization and heating of the interior of the reaction vessel are performed only by injecting water vapor into the vessel, and crushing of the raw material is performed by the pressure and temperature in the reaction vessel, it is not necessary to separately provide a heater and a crushing unit to crush the raw material. As a result, the cost of equipment and operation can be reduced as compared to the conventional method.

An oil producing apparatus according to the present invention made as to achieve the above-described object includes: a reaction vessel provided with an inlet port for receiving feeding of raw material composed of an agricultural residue or a fishery residue and an outlet port for taking out products; a water vapor injecting unit for injecting saturated water vapor into the reaction vessel into which the raw material has been fed; a kneading unit for kneading a content in the reaction vessel; a temperature sensor provided at a lower part of the reaction vessel; a pressure regulating unit for regulating pressure in the reaction vessel; a control unit for drive control of the water vapor injecting unit, the kneading unit, and the pressure regulating unit based on the temperature detected by the temperature sensor or the pressure regulated by the pressure regulating unit; a housing to make a working area oxygen-free which is from the outlet port from which the product in the reaction vessel is taken out to an area for extraction of oil; a solid-liquid separating unit provided in the housing for separating solid components from the product; a water removing unit provided in the housing for removing water from liquid after the removal of solid using the solid-liquid separating unit; and a nitrogen injecting device for injecting nitrogen into the housing.

According to such a configuration, the inside of the sealed vessel can be brought into a high pressure and high temperature state by injecting water vapor into the reaction vessel containing the raw material composed of the agricultural residue or the fishery residue. As a result, it is possible to effectively crush cell membranes of the raw material and to break the outer shell of seeds and the like by a pressure difference and high heat, and to easily obtain oil in the seeds and oil in the coats.

In addition, since the process is performed in oxygen-free condition from taking out of the product in the reaction vessel to the extraction of the oil, oxidation of oil can be prevented, and a product with stable quality and high safety can be obtained.

In addition, since the pressure in the reaction vessel is much lower than that of a reaction vessel used in the conventional oil separation method, such a high pressure durable reaction vessel conventionally employed is not necessary.

Moreover, since pressurization and heating of the interior of the reaction vessel are performed only by injecting water vapor into the vessel, and crushing of the raw material is performed by the pressure and temperature in the reaction vessel, it is not necessary to separately provide a heater and a crushing unit configured to crush the raw material. As a result, the cost of equipment and operation can be reduced as compared to the conventional method.

According to the present invention, it is possible to obtain an method of producing oil and an oil producing apparatus capable of extracting highly safe oil easily and at low cost from residues of agricultural products and fish, which are conventionally regarded as waste after processing.

DESCRIPTION OF THE PREFERRED EMBODIMENTS

Figure 1:
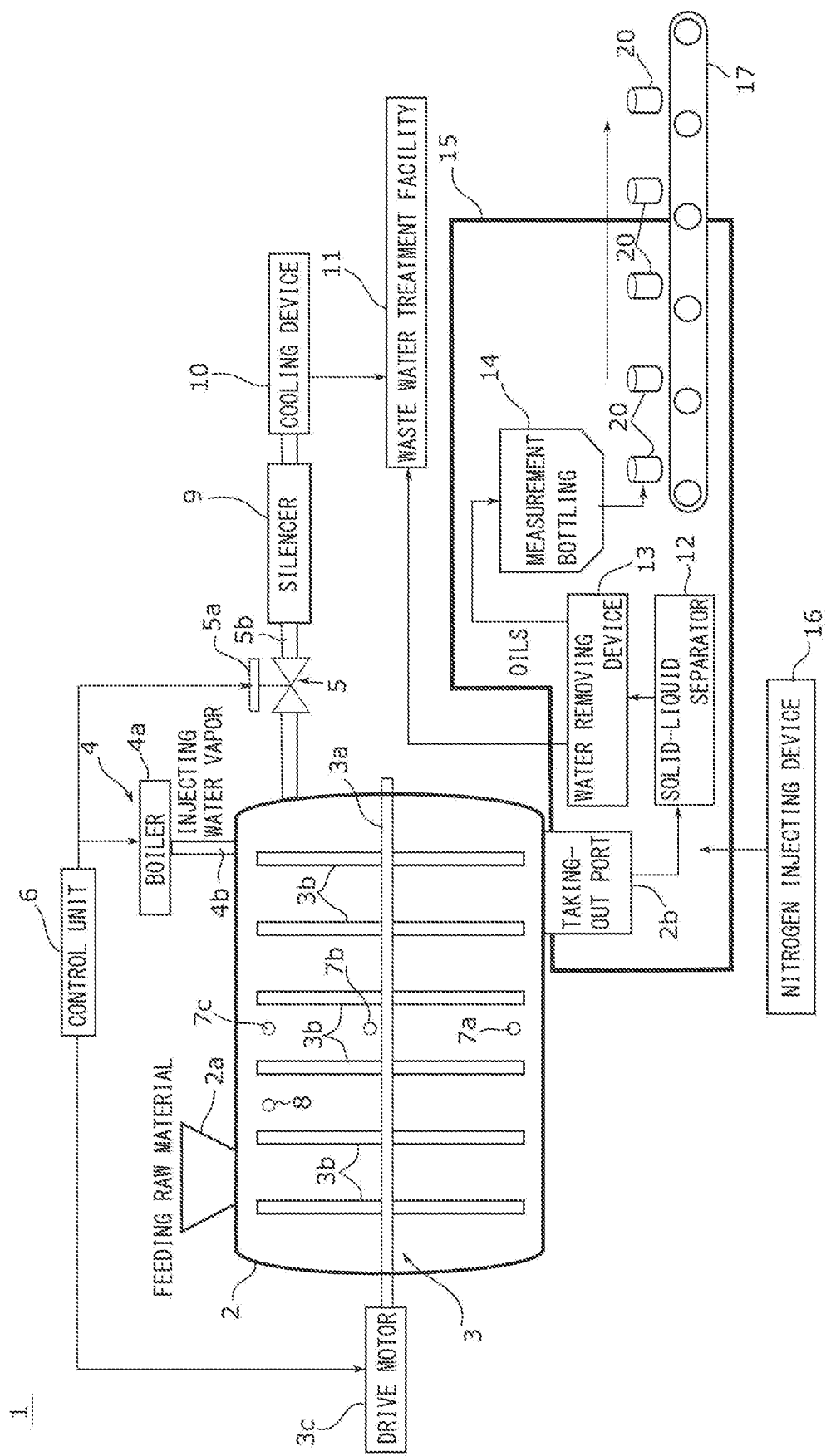
FIG. 1 is a block diagram showing an embodiment of an oil producing apparatus according to the present invention.

Hereinafter, embodiments of a method of producing oil and an oil producing apparatus according to the present invention will be described with reference to the drawings. FIG. 1 is a block diagram showing an embodiment of an oil producing apparatus according to the present invention;

As shown in FIG. 1, the oil producing apparatus 1 of the present embodiment includes a reaction vessel 2, a hydrothermal reaction vessel, for holding and processing an agricultural residue, including a residue of agricultural products after processing, out-of-standard agricultural products, waste, and the like, or a fishery residue, including a residue of fish after processing, out-of-standard fish, an inlet port 2a through which a raw material composed of the residue into the reaction vessel 2 is fed, and a kneading unit 3 for kneading the raw material fed into the reaction vessel 2.

In addition, the oil producing apparatus 1 includes a water vapor injecting unit 4 that injects high-pressure water vapor to the raw material in the reaction vessel 2 and a pressure-regulating unit 5 that regulates the pressure inside the reaction vessel 2.

In addition, the oil producing apparatus 1 includes an outlet port 2b through which the product processed in the reaction vessel 2 is taken out to the outside of the vessel, and a housing 15 provided for blocking outside air, oxygen, in a working area where oil is finally obtained from the product taken out from the outlet port 2b.

The oil producing apparatus 1 includes a nitrogen-injecting device 16 that injects nitrogen gas, $N_2$ gas, into the housing 15. The pressure in the housing 15 is maintained with this nitrogen injecting device 16 to be a predetermined value of slightly positive pressure, 0.2 MPa, for example, and thereby oxygen, $O_2$, being expelled to achieve an oxygen-free atmosphere.

Moreover, the oil producing apparatus 1 includes, in the housing 15, a solid-liquid separator 12, a solid-liquid separating means, that removes unnecessary solids such as sediments and foreign substances from a product taken out from the outlet port 2b, a water removing device 13, a water removing means that removes the water from the liquid from which the solid has been removed, and a bottling device 14 that measures the extracted oil and bottles the extracted oil into a plurality of vessels 20.

Moreover, the vessels 20 containing oil may be configured to transfer from the housing 15 by the conveyor device 17 as illustrated.

Furthermore, the oil producing apparatus 1 includes a control unit 6 including a computer that controls the kneading unit 3, the water vapor injecting unit 4, the pressure regulating unit 5, and so forth.

Each component will be described in more detail.

The reaction vessel 2 is formed of a Class-1 pressure vessel (regulated by the Industrial Safety and Health Act of Japan) having a predetermined pressure resistance, and processes the raw material therein. In addition, since the working pressure ranges from 1.1 MPa to 1.75 MPa, the reaction vessel 2 may be any vessel that can withstand a pressure of about 2 MPa.

An inlet port 2a is provided in the upper portion of the reaction vessel 2, and an outlet port 2b from which the product containing a large amount of oil obtained by hydrothermal treatment is taken out to the outside is provided in a lower portion of the reaction vessel 2.

The inlet port 2a and the outlet port 2b each have a sealed structure, a valve structure, using a packing that can withstand high temperature and pressure in the reaction vessel 2 when the raw material is processed.

The inlet port 2a and the outlet port 2b each have an interlock control unit which prevents from responding to an opening/closing operation unless the pressure in the reaction vessel 2 reaches 0.015 MPa or below, in consideration of safety.

Furthermore, a temperature sensor 7a is provided at an inner lower part, a temperature sensor 7b is provided at an inner center part, and a temperature sensor 7c is provided at an inner upper part of the reaction vessel 2. A pressure sensor 8 is additionally provided in an inner upper part so as to detect the pressure in the reaction vessel 2 as well.

In particular, because the temperature sensor 7a is disposed at the inner lower part of the reaction vessel 2, the temperature of the product, raw material being processed, located at the inner lower part of the reaction vessel 2 at the lower part can be measured; in that area of the reaction vessel the temperature is usually the lowest. In other words, by measuring the temperature of the product located in the lower part of the reaction vessel 2, it can be confirmed that the temperature of the entire product has a temperature equal to or higher than the temperature measured by the temperature sensor 7a.

As described above, since the temperature sensor 7b is provided at the inner center part of the vessel and the temperature sensor 7c is provided at the inner upper part of the vessel, fine temperature control of the entire product can be achieved.

The kneading unit 3 is intended for uniformly kneading the entire raw materials in the vessel. The kneading unit 3 extends in the longitudinal direction in the reaction vessel 2 and includes a horizontal rotation shaft 3a rotatably supported and kneading blades 3b attached to the horizontal rotation shaft 3a.

Further, a drive motor 3c is coupled to the horizontal rotation shaft 3a, and the kneading blades 3b are driven by the drive motor 3c to rotate.

Further, the water vapor injecting unit 4 includes a boiler 4a that generates high-pressure water vapor, saturated water vapor, and an air supply pipe 4b that supplies water vapor, saturated water vapor, generated from the boiler 4a into the reaction vessel 2.

The pressure of the water vapor, saturated water vapor, generated by the boiler 4a is maintained at a constant value, and the pressure in the reaction vessel 2 is adjusted by an amount of injection of high-pressure water vapor, high pressure saturated water vapor.

The temperature in the reaction vessel 2 is determined by the pressure of the high pressure water vapor, high pressure saturated water vapor, and the interior of the reaction vessel 2 is kept at high temperature.

The air supply pipe 4b is connected to the reaction vessel 2 at a position above the horizontal rotation shaft 3a and in a substantially horizontal direction.

The pressure-regulating unit 5 includes a pressure regulating valve 5a which is electrically controlled to open and close, and an exhaust pipe 5b configured to exhaust the water vapor in the reaction vessel 2 through the pressure regulating valve 5a.

When the temperature in the reaction vessel 2 exceeds a predetermined value, the pressure-regulating valve 5a is opened to depressurize the reaction vessel 2 by releasing the pressure in the reaction vessel 2.

Further, a cooling device 10 is connected to the exhaust pipe 5b via a silencer 9 so that the water vapor from the reaction vessel 2 is cooled and liquefied to be supplied to the waste treatment facility 11. Furthermore, the silencer 9 is designed to be installed in an urban area and the like by clearing a regulation value of a noise prevention ordinance.

The control unit 6 is electrically connected to the kneading unit 3, the water vapor injecting unit 4 and the pressure-regulating unit 5, and is configured to control these units. Further, the control unit 6 controls the rotation direction and the rotation speed of the drive motor 3c to control start and stop of the kneading of the raw material in the reaction vessel 2.

The control unit 6 is electrically connected to the temperature sensors 7a through 7c and the pressure sensor 8 in the reaction vessel 2, and controls driving of the drive motor 3c, a water vapor injecting unit 4, and the pressure regulating unit 5, based on received signals from the temperature sensors 7a through 7c.

For example, the control unit 6 controls to stop injection of water vapor into the reaction vessel 2 with the water vapor injecting unit 4 when the detected temperature and pressure in the reaction vessel 2 respectively reach predetermined values.

Furthermore, when the temperature in the reaction vessel 2 reaches a predetermined value, the control unit 6 opens the pressure-regulating valve 5a of the pressure regulating unit 5 to exhaust high pressure water vapor, and controls to lower the pressure and temperature.

Next, the method of producing oil by the oil producing apparatus 1 of the present embodiment will be described.

First, a case of using avocado as a raw material as an agricultural residue will be described.

Figure 2:
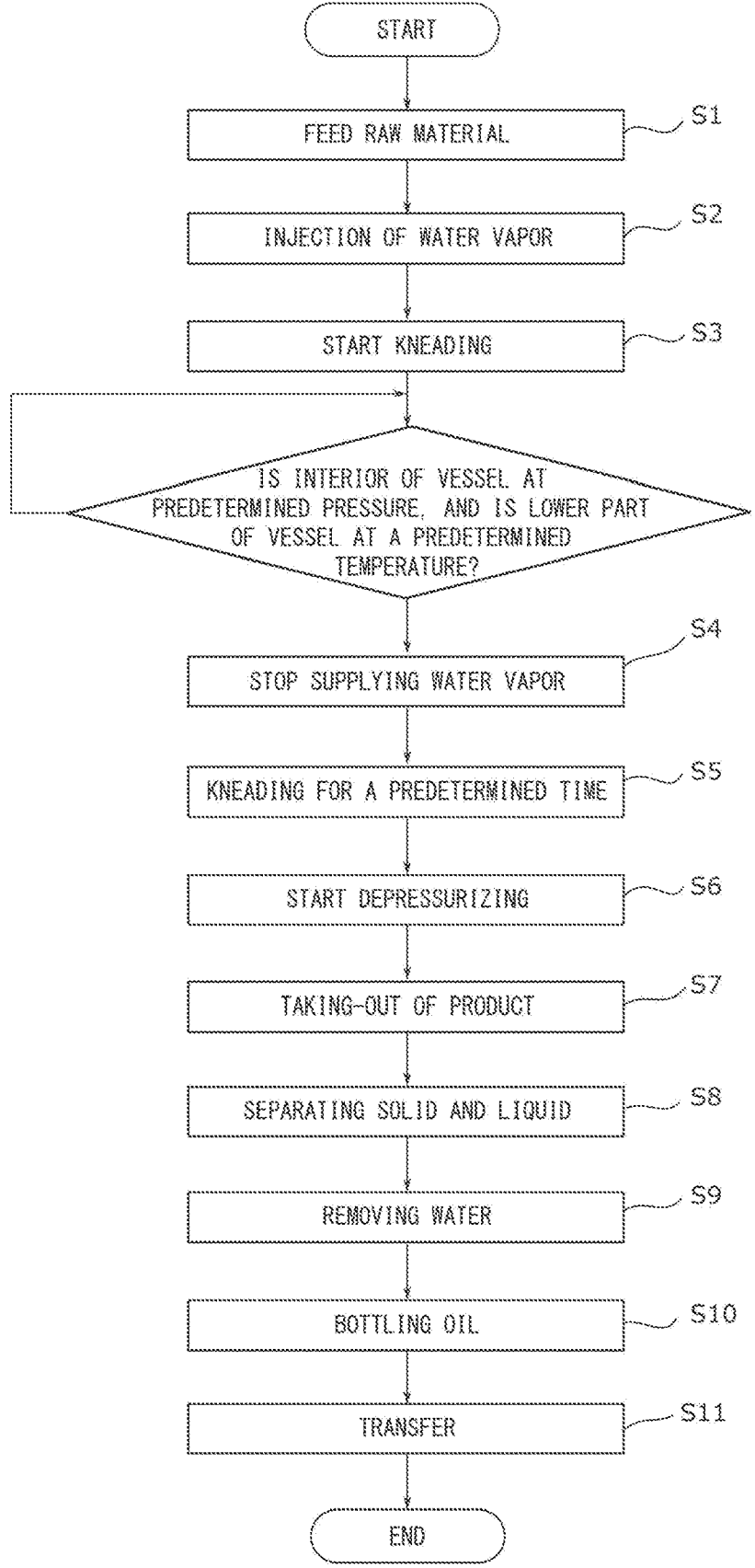
FIG. 2 is a flowchart showing a flow of a method of producing oil using the oil producing apparatus of FIG. 1.
Figure 3:
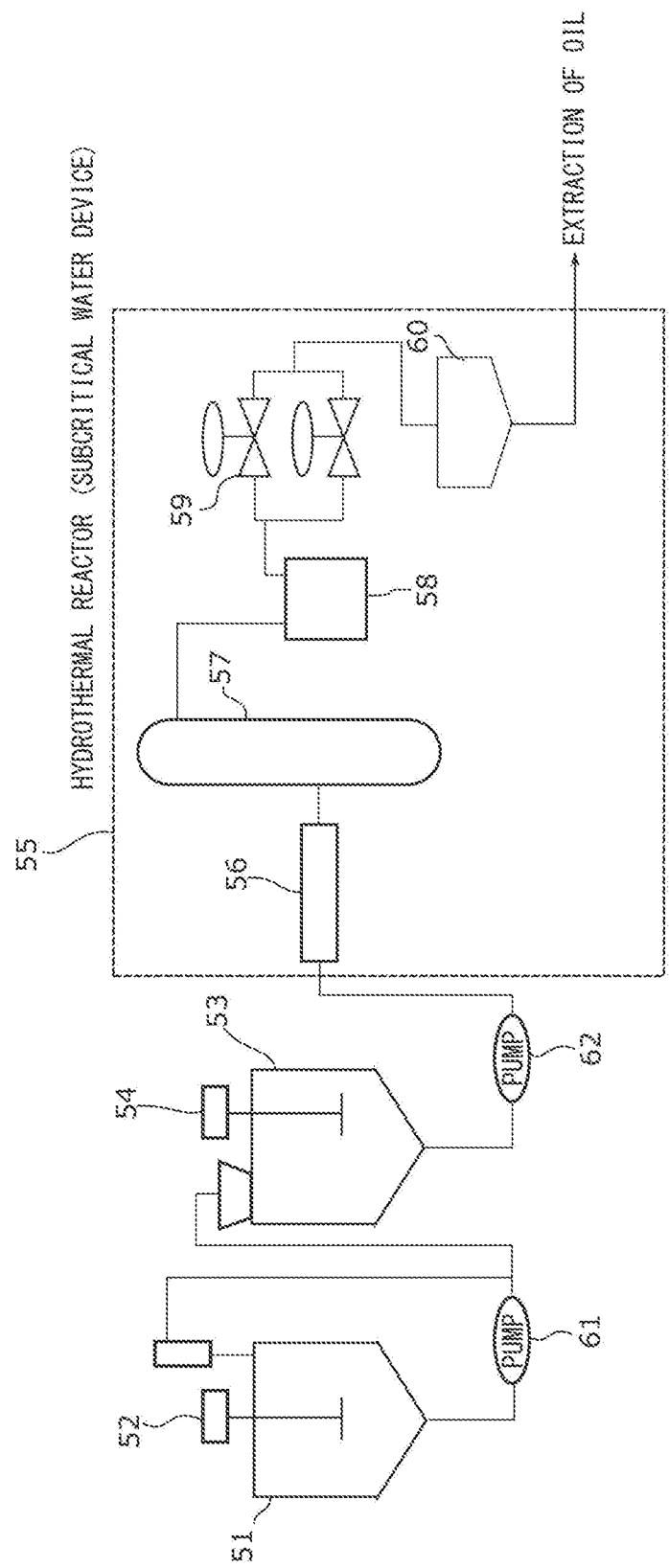
FIG. 3 is a block diagram for explaining a method of separating oil from food residue in the related art.

Avocado, a raw material, is fed into the reaction vessel 2 through the inlet port 2a, Step S1 in FIG. 2.

Here, suppose that the volume of the reaction vessel 2 is 5 m$^3$, the amount of the raw material to be fed is, for example, about 4.5 m$^3$. This is intended to leave a predetermined space in the upper part in the vessel.

As for the raw material, any size that passes through the inside of the valve being the inlet port 2a may be acceptable, and, therefore, crushing of the raw material, adjustments of moisture content, particle size, viscosity, and hardness, as pre-processing, necessary in the related art, are not required.

When the inside of the reaction vessel 2 is sealed after the feeding of the raw materials, high pressure water vapor, saturated water vapor, is injected into the space left in the upper part of the reaction vessel 2 by the water vapor injecting unit 4, Step S2 in FIG. 2. The water vapor injected here functions as a pressure gas and depresses the height, the height level of contents, of the raw material in the reaction vessel 2.

The control unit 6 monitors the temperature of the lower part of the vessel with the temperature sensor 7a. The control unit 6 drives the drive motor 3c of the kneading unit 3 when it rises to 80° C., for example, and starts kneading in a predetermined direction at a predetermined rotation speed, for example, 2 rpm, Step S3 in FIG. 2.

Furthermore, when the temperature at the lower part of the vessel rises to around 90° C., the control unit 6 increases the kneading speed, for example, 10 rpm, with checking the temperature increasing speed.

Then, when the raw material is avocado residue, for example, the control unit 6 stops the supply of water vapor by the water vapor injecting unit 4 when the temperature of the lower part of the vessel reaches 120.7° C. and the pressure in the vessel 2 reaches 1.20 MPa, Step S4 in FIG. 2. The temperature and pressure at which water vapor supply is stopped are values set for every kind of raw material.

When the supply of water vapor into the reaction vessel 2 is stopped, the control unit 6 operates the kneading unit 3 to perform only kneading for a predetermined time of 5 to 10 minutes, for example, at a rotation speed of 10 rpm, for example, Step S5 in FIG. 2.

Then, the control unit 6 monitors the temperature of the lower part of the vessel by the temperature sensor 7a, stops the kneading when the temperature reaches a predetermined temperature, for example, 124° C., and starts a pressure reduction operation, by controlling the pressure regulating unit 5 to open the pressure regulating valve 5a, Step S6 in FIG. 2.

In other words, the high-pressure water vapor in the reaction vessel 2 is exhausted through the exhaust pipe 5b, and the pressure in the reaction vessel 2 is reduced. The target temperature for starting the pressure reduction is a value set for each type of raw material.

Thereafter, the control unit 6 monitors the pressure inside of the reaction vessel 2 with the pressure sensor 8 and, after the pressure in the reaction vessel 2 reaches a value of the interlock condition, gradually opens the valve, being the outlet port 2b, to deliver the product to the solid-liquid separator 12, Step S7 in FIG. 2.

In the process in the reaction vessel 2 described above, the inside of the reaction vessel 2 has a high pressure, for example, 1.20 MPa, and a high temperature, for example, 120.7° C., so that the cell membranes of the raw material are crushed and the shells of seeds and the like are destroyed by a pressure difference and high heat. Large amounts of oil in seeds, oil in coats, and the like are obtained in the product.

Meanwhile, the inside of the housing 15 is maintained in an oxygen-free condition at a predetermined slightly positive pressure of 0.2 MPa, for example, with nitrogen gas, $N_2$, supplied from the nitrogen injecting device 16.

Unnecessary debris and foreign substances are removed from the product taken out from the outlet port 2b of the reaction vessel 2 through the solid-liquid separator 12 in the housing 15, Step S8 in FIG. 2, and further, water is removed in the water removing device 13, Step S9 in FIG. 2, and the obtained oil is bottled in the vessel 20 by the bottling device 14, Step S10 in FIG. 2.

Then, the vessel 20 in which oil are bottled in an oxygen-free condition is transferred from the housing 15 by the conveyor device 17, Step S11 in FIG. 2.

Here, as described above, since the inside of the housing 15 is in an oxygen-free atmosphere, the oil are not oxidized, and consequently oil with stable quality can be obtained.

As described above, according to the embodiment of the present invention, by injecting water vapor into the reaction vessel 2 containing the raw material consisting of an agricultural residue or a fishery residue, the inside of the sealed vessel can be brought to a high pressure and high temperature state.

As a result, it is possible to effectively crush cell membranes of the raw material and to break the outer shell of the seed and the like by a pressure difference and high heat, and easily obtain oil in the seeds and oil in the coats.

In addition, since the process from the taking out of the product in the reaction vessel to the extraction of the oil is performed in oxygen-free atmosphere, oxidation of oil can be prevented, and a product with stable quality and high safety can be obtained.

Further, because the pressure in the reaction vessel 2 can be made much lower than that of the reaction vessel used in the conventional oil separation method, the high-pressure durable reaction vessel conventionally employed becomes unnecessary.

Moreover, because pressurization and heating in the reaction vessel 2 are performed only by injecting water vapor into the vessel 2 and crushing of the raw material is performed by the pressure and temperature in the reaction vessel 2, so that a heater and a crushing unit for the raw material need not to be provided separately. As a result, the cost of equipment and operation can be reduced as compared to the related art.

In the above-described embodiment, an operation control is performed by setting a target temperature for each of a timing of stopping injection of water vapor and a timing of starting a pressure reduction. However, the present invention is not limited to that form of the embodiment.

For example, when one target value of temperature and pressure is reached, control may be performed to stop injection of water vapor, to immediately stop kneading and start reducing pressure.

EXAMPLE

Then, a method of producing oil and an oil producing apparatus of the present invention are further demonstrated based on an Example.

Experiment 1

In Experiment 1, in the oil producing apparatus shown in the present embodiment, possibility of extraction of oil from a residue, using an avocado residue as a raw material, was verified by varying conditions of kneading, temperature and others.

Example 1

In Example 1, 3000 Kg of avocado residue was used as a raw material, and extraction of oil was performed in the procedure shown in the present embodiment under the conditions shown in Table 1. The target temperature at the time when the injection of water vapor was stopped was 120° C., the target pressure was 1.2 MPa or more, and the target temperature at the start of the pressure reduction was 124° C. In addition, the rotation direction in Table 1 indicates a forward rotation direction (clockwise, for example; same in the subsequent paragraphs) by F and a reverse rotation direction (counter-clockwise, for example; same in the subsequent paragraphs) by R.

TABLE 1

| Example 1 | Elapsed time from feeding of raw material (min) | Kneading speed (rpm), direction of rotation | Pressure (MPa) | Temperature of upper part (° C.) | Temperature of central part (° C.) | Temperature of lower part (° C.) |
| --- | --- | --- | --- | --- | --- | --- |
| Start injection of water vapor | 1 | 4, R | 0.22 | 131 | 89 | 45.6 |
| Start kneading | 3 | 10, F | 0.32 | 136 | 129 | 40.9 |
| Stop injection of water vapor | 63 | 10, F | 1.21 | 179 | 127 | 120.7 |
| Start decompression | 71 | — | 1.21 | 154 | 128 | 124.0 |

As a result of Example 1, the time required for the process was 71 minutes, and the amount of oil extracted from the seeds, coats and flesh parts was 1409.5 Kg. That is, a sufficient amount of oil was obtained from 3000 kg of raw materials.

Example 2

In Example 2, 3000 Kg of avocado residue was used as a raw material, and extraction of oil was performed in the procedure shown in the present embodiment under the conditions shown in Table 2. The target temperature at the time when injection of water vapor was stopped was 123° C., the target pressure was 1.2 MPa or more, and the target temperature at the start of the pressure reduction was 123° C. In the rotation direction in Table 2, the forward rotation direction is indicated by F and the reverse rotation direction is indicated by R.

TABLE 2

| Example 2 | Elapsed time from feeding of raw material (min) | Kneading speed (rpm), direction of rotation | Pressure (MPa) | Temperature of upper part (° C.) | Temperature of central part (° C.) | Temperature of lower part (° C.) |
|---|---|---|---|---|---|---|
| Start injection of water vapor | 14 | 2, F | 0.22 | 115 | 91 | 54 |
| Start kneading | 28 | 10, F | 1.24 | 162 | 142 | 52 |
| Stop injection of water vapor | 85 | 10, R | 1.20 | 159 | 127 | 123 |
| Start decompression | 85 | — | 1.20 | 159 | 127 | 123 |

As a result of Example 2, the processing time was 85 minutes, and the extraction amount of the oil extracted from the seeds, the coats and the flesh parts was 1200 Kg. That is, a sufficient amount of oil was obtained from 3000 kg of raw materials.

Example 3

In Example 3, 3000 Kg of avocado residue was used as a raw material, and extraction of oil was performed in the procedure shown in the present embodiment under the conditions shown in Table 3. The target temperature at the time when injection of water vapor was stopped was 124° C., the target pressure was 1.2 MPa or more, and the target temperature at the start of the pressure reduction was 124° C. In the rotation direction in Table 3, the forward rotation direction is indicated by F and the reverse rotation direction is indicated by R.

TABLE 3

| Example 3 | Elapsed time from feeding of raw material (min) | Kneading speed (rpm), direction of rotation | Pressure (MPa) | Temperature of upper part (° C.) | Temperature of central part (° C.) | Temperature of lower part (° C.) |
|---|---|---|---|---|---|---|
| Start injection of water vapor | 19 | 2, F | 0.12 | 119 | 92 | 61.2 |
| Start kneading | 30 | 2, F | 1.18 | 183 | 154 | 52.0 |
| Stop injection of water vapor | 89 | 10, R | 1.28 | 182 | 122 | 124.0 |
| Start decompression | 95 | — | 1.28 | 182 | 122 | 124.0 |

As a result of Example 3, the process time was 95 minutes, and the extraction amount of the oil extracted from the seeds, the coats and the flesh parts was 1392 Kg. That is, a sufficient amount of oil was obtained relative to the quantity of a raw material.

Comparative Example 1

In Comparative Example 1, 2545 Kg of avocado residue was used as a raw material, and extraction of oil was performed according to the procedure shown in the present embodiment under the conditions shown in Table 4. The target temperature at the time when injection of water vapor was stopped was 113° C., the target pressure was 0.90 MPa or more, and the target temperature at the start of the pressure reduction was 121° C. In Table 4, the forward rotation direction is indicated by F, and the reverse rotation direction is indicated by R.

TABLE 4

| Comparative Example 1 | Elapsed time from feeding of raw material (min) | Kneading speed (rpm), direction of rotation | Pressure (MPa) | Temperature of upper part (° C.) | Temperature of central part (° C.) | Temperature of lower part (° C.) |
|---|---|---|---|---|---|---|
| Start injection of water vapor | 8 | 6, F | 0.15 | 120 | 116 | 74.6 |
| Start kneading | 18 | 8, F | 0.15 | 132 | 116 | 60.5 |
| Stop injection of water vapor | 82 | 8, F | 0.98 | 176 | 134 | 113.0 |

TABLE 4-continued

| Comparative Example 1 | Elapsed time from feeding of raw material (min) | Kneading speed (rpm), direction of rotation | Pressure (MPa) | Temperature of upper part (° C.) | Temperature of central part (° C.) | Temperature of lower part (° C.) |
|---|---|---|---|---|---|---|
| Start decompression | 84 | — | 0.98 | 176 | 134 | 121.0 |

As a result of Comparative Example 1, the time required for the process was 94 minutes, and the extraction amount extracted from the seeds, coats and flesh parts was 488 Kg. That is, the amount of oil extracted was smaller relative to the raw material 2545 Kg.

As a result of Experiment 1, it is confirmed that a sufficient amount of oil can be extracted from the raw material in the case where the raw material is avocado residue, if the pressure in the vessel ranges from 1.20 MPa to 1.28 MPa and the temperature in the lower part of the vessel ranges from 120.7° C. to 124° C.

Experiment 2

In Experiment 2, with the oil producing apparatus shown in the present embodiment, it is verified whether the method of producing oil according to the present invention is effective, using residues other than avocado as raw materials.

Example 4 to Example 50

In Examples 4 to 50, based on the conditions such as the target temperature in the reaction vessel determined in advance for each type of raw material, whether sufficient oil can be obtained by the method of producing oil described in the present embodiment is verified. The conditions for each raw material are shown in Tables 5-7. The temperature of the lower part of the vessel in the table indicates the temperature at which a reduction of the pressure in the vessel was started, which is the same as the temperature at which injection of water vapor was stopped depending on the raw material.

TABLE 5

| | Raw material | Temperature of lower part of vessel (° C.) | Maximum pressure (MPa) | Maximum speed of kneading (rpm) |
|---|---|---|---|---|
| Example 4 | Soy leaves, beans | 120 | 1.4 | 12 |
| Example 5 | Peanut leaves, beans | 114 | 1.1 | 11 |
| Example 6 | Safflower seeds | 114 | 1.3 | 12 |
| Example 7 | Corn | 113 | 1.2 | 9 |
| Example 8 | Coconut | 114 | 1.2 | 8 |
| Example 9 | Olive fruits, seeds | 114 | 1.3 | 8 |
| Example 10 | Sunflower seeds | 123 | 1.4 | 11 |
| Example 11 | Sesame seeds | 125 | 1.45 | 12 |
| Example 12 | Cotton seeds | 112 | 1.1 | 12 |
| Example 13 | Flesh of oil palm | 111 | 1.5 | 8 |
| Example 14 | Endosperm of oil palm | 112 | 1.1 | 7 |
| Example 15 | Brassica seeds | 110 | 1.1 | 9 |
| Example 16 | Pistachio seeds | 127 | 1.3 | 11 |
| Example 17 | Cashew seeds | 127 | 1.4 | 11 |
| Example 18 | Macadamia seeds | 123 | 1.4 | 12 |
| Example 19 | Pine nuts | 118 | 1.15 | 9 |
| Example 20 | Hazelnuts and seeds | 120 | 1.3 | 11 |
| Example 21 | Almond fruits and seeds | 120 | 1.2 | 7 |

TABLE 6

| | Raw material | Temperature of lower part of vessel (° C.) | Maximum pressure (MPa) | Maximum speed of kneading (rpm) |
|---|---|---|---|---|
| Example 22 | Sasa veitchii leaves, stems | 181 | 1.75 | 12 |
| Example 23 | Mongongo fruits | 113 | 1.1 | 11 |
| Example 24 | Pecan fruits | 119 | 1.5 | 11 |
| Example 25 | Gourd seeds | 123 | 1.1 | 11 |
| Example 26 | Acai berry seeds | 117 | 1.2 | 9 |
| Example 27 | Black Currant seeds, seeds | 121 | 1.45 | 12 |
| Example 28 | Apple seeds | 128 | 1.27 | 10 |
| Example 29 | Flax fruits, flaxseeds | 119 | 1.42 | 9 |
| Example 30 | Borneo seeds | 118 | 1.1 | 9 |
| Example 31 | Jujube seeds | 114 | 1.27 | 12 |
| Example 32 | Okra seeds | 113 | 1.3 | 7 |
| Example 33 | Rice bran | 123 | 1.3 | 7 |
| Example 34 | Papaya seeds | 123 | 1.28 | 7 |
| Example 35 | Coriander seeds | 133 | 1.42 | 9 |
| Example 36 | Chestnuts and seeds | 124 | 1.27 | 9 |
| Example 37 | Amaranthus seeds | 125 | 1.43 | 10 |
| Example 38 | Argania seeds | 123 | 1.4 | 9 |
| Example 39 | Tea seeds | 116 | 1.3 | 8 |

TABLE 7

| | Raw material | Temperature of lower part of vessel (° C.) | Maximum pressure (MPa) | Maximum speed of kneading (rpm) |
|---|---|---|---|---|
| Example 40 | Cacao stem, fruits, seeds | 131 | 1.3 | 8 |
| Example 41 | Perilla seeds | 130 | 1.2 | 7 |
| Example 42 | Prune seeds | 117 | 1.1 | 8 |
| Example 43 | Poppy seeds | 117 | 1.1 | 8 |
| Example 44 | Camellia seeds | 120 | 7.3 | 9 |
| Example 45 | Wheat germ | 113 | 1.28 | 10 |
| Example 46 | Thistle seeds | 122 | 1.5 | 9 |
| Example 47 | Tomato seeds | 124 | 1.41 | 9 |
| Example 48 | Pumpkin fruits, coats, seeds | 126 | 1.4 | 10 |
| Example 49 | Fishery residue (viscera, bone) | 179 | 1.65 | 10 |
| Example 50 | Seaweed | 130 | 1.34 | 10 |

As a result of Examples 4 to 50, a sufficient amount of oil could be extracted from the raw materials similar to the case of avocado. That is, by raising the temperature of lower part of vessel to the target temperature set for each raw material and the pressure in the sealed vessel, it is confirmed that oil can be extracted effectively in a condition of the high temperature and the high pressure.

That is, it is confirmed that by setting the pressure in the vessel to 1.1 MPa to 1.75 MPa and the temperature in the vessel to 110° C. to 181° C., sufficient oil can be extracted from any of the raw materials in Examples 4 to 50.

As a result of the above embodiments, according to the method of producing oil of the present invention, it is confirmed that highly safe oils can be extracted at low cost and easily from residues of agricultural products and fish which are regarded as wastes after processing in the related art.

What is claimed is:

1. A method of producing oil comprising:
a step of feeding a raw material composed of an agricultural residue or a fishery residue into a reaction vessel;
a step of injecting saturated water vapor in the reaction vessel after the feeding of the raw material;
a step of starting kneading in the reaction vessel with keeping on injecting the water vapor;
a step of terminating the injection of the water vapor at a timing when pressure in the reaction vessel and temperature of a lower part of the reaction vessel respectively rise to a predetermined pressure and a predetermined temperature being set based on a type of the raw material;
a step of depressurizing the interior of the reaction vessel, and then taking a product out from the interior of the reaction vessel; and
a step of extracting oil from the product in an oxygen-free condition,
wherein the step of extracting oil from the product in the oxygen-free condition includes a step of solid-liquid separation where the solid is removed from the product, and a step of obtaining oil by removing water from the liquid obtained in the step of solid-liquid separation, and
the step of extracting oil from the product in an oxygen-free condition is performed in a housing in which nitrogen gas is introduced.

2. The method of producing oil according to claim 1, further comprising
a step of continuing kneading for a predetermined time until the temperature of the lower part in the reaction vessel reaches a predetermined temperature after completion of the injection of water vapor,
wherein the pressure in the reaction vessel is then reduced.

3. The method of producing oil according to claim 1,
wherein in the step of terminating the injection of the water vapor at a time when pressure in the reaction vessel and temperature of a lower part of the reaction vessel respectively rises to a predetermined pressure and a predetermined temperature being set based on a type of the raw material,
the predetermined pressure ranges from 1.1 MPa to 1.75 MPa, and
the predetermined temperature ranges from 110° C. to 181° C.

4. The method of producing oil described in claim 3,
wherein the raw material is avocado, and in the step of terminating the injection of the water vapor at the time when the pressure in the reaction vessel and the temperature of the lower part of the reaction vessel rises to a predetermined pressure and a predetermined temperature being set based on a type of the raw material,
the predetermined pressure is at least 1.20 MPa, and
the predetermined temperature is at least 120.7° C.

5. An oil production apparatus comprising:
a reaction vessel including an inlet port through which raw material composed of an agricultural residue or a fishery residue is fed and an outlet port through which a product is taken out;
a water vapor injecting unit for injecting saturated water vapor into the reaction vessel in which the raw material has been fed;
a kneading unit for kneading a content in the reaction vessel;
a temperature sensor disposed at a lower part of the reaction vessel;
a pressure regulating unit for regulating pressure in the reaction vessel;
a control unit for controlling driving of the water vapor injecting unit, the kneading unit, and the pressure regulating unit based on temperature measured by the temperature sensor or pressure regulated by the pressure regulating unit;
a housing for making a working area in an oxygen-free condition, the area in which a process from taking out of the product in the reaction vessel from the outlet port to extraction of the oil is performed;
a solid-liquid separating unit provided in the housing for separating solid from the product;
a water removing unit provided in the housing for removing water from a liquid after separating the solid by the solid-liquid separating unit; and
a nitrogen injecting device for injecting nitrogen into the housing.

* * * * *